March 5, 1957 C. W. EARP 2,784,257

RECEIVERS FOR PULSE COMMUNICATION SYSTEMS

Filed Nov. 23, 1951 6 Sheets-Sheet 1

Inventor
C.W.EARP
By Philip M. Bolton
Attorney

March 5, 1957 C. W. EARP 2,784,257

RECEIVERS FOR PULSE COMMUNICATION SYSTEMS

Filed Nov. 23, 1951 6 Sheets-Sheet 2

Inventor
C.W. EARP
By Philip M. Bolton
Attorney

Inventor
C. W. EARP
By Philip M. Bolton
Attorney

March 5, 1957 C. W. EARP 2,784,257

RECEIVERS FOR PULSE COMMUNICATION SYSTEMS

Filed Nov. 23, 1951 6 Sheets-Sheet 4

Inventor
C.W. EARP
By Philip M. Bolton
Attorney

Inventor
C.W.EARP
By Philip M. Bolton
Attorney

March 5, 1957 C. W. EARP 2,784,257

RECEIVERS FOR PULSE COMMUNICATION SYSTEMS

Filed Nov. 23, 1951 6 Sheets-Sheet 6

Inventor
C. W. EARP
By Philip M. Bolton
Attorney

United States Patent Office 2,784,257

Patented Mar. 5, 1957

2,784,257

RECEIVERS FOR PULSE COMMUNICATION SYSTEMS

Charles William Earp, London, England, assignor to International Standard Electric Corporation, New York, N. Y., a corporation of Delaware Application November 23, 1951, Serial No. 257,808

Claims priority, application Great Britain December 1, 1950

1 Claim. (Cl. 179—15.6)

The present invention relates to electric communication receivers and concerns particularly a technique whereby an improvement in signal-to-noise ratio can be obtained in a system in which the received signals are characterised by two or more index signals or parameters.

By "index" we mean a quantity or parameter such, for example, as the displacement of a pulse, or the frequency of a wave, which can indicate the magnitude of a sample of some function of an electrical wave and in the following description by "ambiguously" we mean that any one value indicated by the index corresponds to more than one value of the sample.

In the specification of co-pending application of Charles W. Earp, Serial No. 257,807, filed November 23, 1951 a communication system is described and claimed in which an input wave is periodically sampled and in which each sample is represented by two or more different quantities or indices which are used jointly at the receiver to reconstruct the sample somewhat on the lines of the known pulse code modulation system. However there is this fundamental difference, namely, that the quantities or indices are not quantised (which is essential in a pulse code modulation system), and each of the quantities or indices which are transmitted, represents the sample with reference to a continuous scale, so that the sample is reconstructed at the receiver without the distortion which is inherent in a code modulation system. The characteristic feature of this new system is that at least one of the indices is ambiguous (often all of them are): that is, any value of the index can represent several different values of the sample. By suitably combining all the indices at the receiver, the ambiguity is resolved.

This system enables a great improvement in signal-to-noise ratio to be obtained, provided that a suitable receiving technique is employed, and it is the object of the present invention to provide such a technique.

This object is achieved according to the invention by providing an arrangement for producing from signals carrying two or more different quantities or indices representing a sample of an intelligence input wave, electric pulses, the time positions of which represent, by their modulation, samples of the corresponding input wave, comprising means for deriving from each sample a plurality of pulse trains of different repetition frequencies, each of which pulse trains bears a time characteristic representing the sample according to a continuous scale, at least one of the representations being ambiguous, and means for selecting from all of the said pulse trains those pulses which are substantially coincident in time.

According to another aspect, the invention provides an electric communication receiver for receiving a plurality of different index signals each consisting of a phase modulated wave, which together represent an input sample of a signal wave, at least one of the index signals being ambiguous, comprising means for deriving from each phase modulated wave a corresponding comb of pulses having a pulse repetition frequency integrally related to the frequency of the phase modulated wave, all of the said combs having different pulse repetition frequencies, but the same envelope time shift, means for applying all the combs of pulses to a coincidence circuit, and means for deriving a single output pulse from the said circuit in response to a simultaneous application thereto of one pulse from each comb.

The invention will be described with reference to the accompanying drawings, in which Fig. 1 shows a block schematic circuit diagram of the transmitting arrangements of a communication system employing ambiguous indices to which the present invention is applicable.

Figure 3:
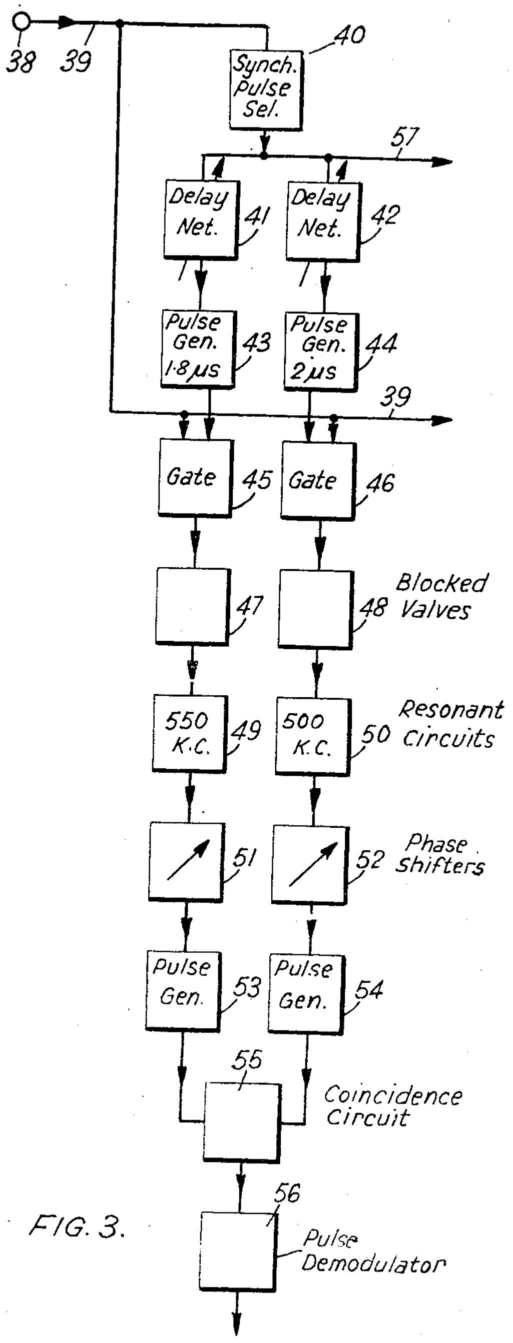
Fig. 3 shows a block schematic circuit diagram of a receiver for the above system incorporating features of the present invention.
Figure 8:
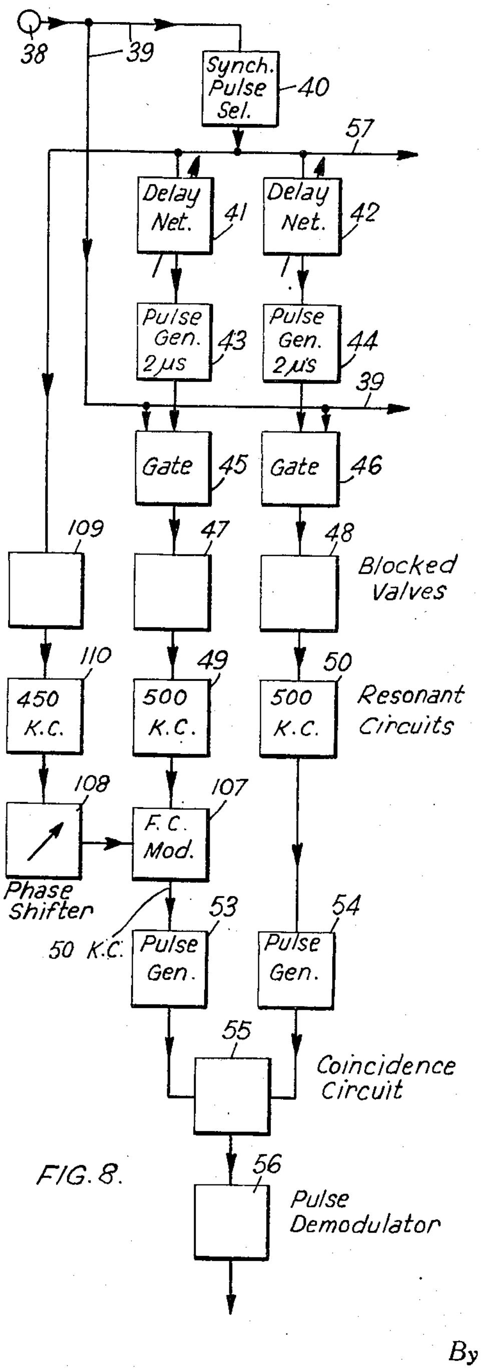
Fig. 8 shows a block schematic circuit diagram of a receiver for the system of Fig. 7, incorporating features of the present invention.

Although the invention is concerned with receiving arrangements only, it will be necessary to describe the transmitting arrangements of the system of the specification already referred to above, in order that the present invention, which is embodied in the circuits shown in Figs. 3 and 8, can be understood. No claim is therefore made in the present specification to the transmitting arrangements of the system.

Figure 1:
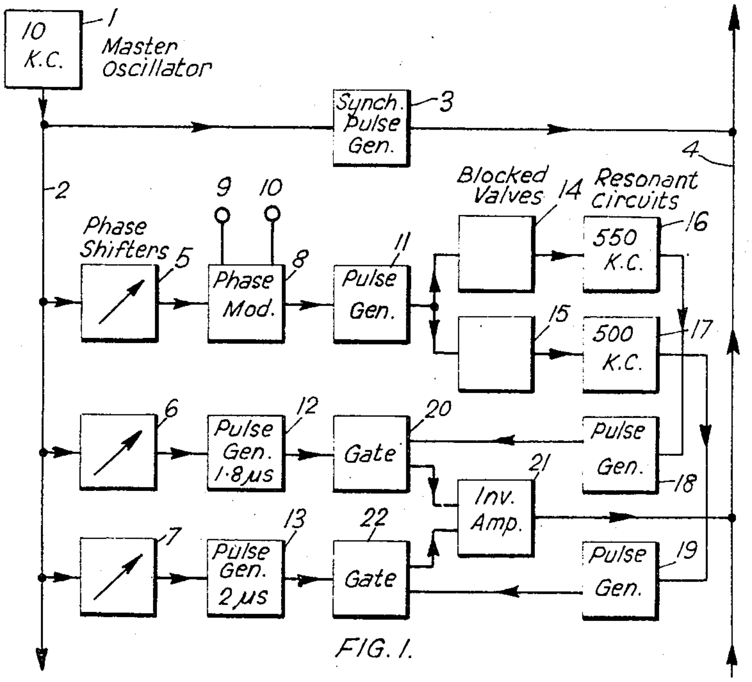

The invention will be illustrated in its application to a pulse position modulation system, the transmitting arrangements of which are shown in Fig. 1.

It will be assumed that the system will provide 12 channels for the transmission of speech signals occupying a frequency band whose upper limit is 3 kilocycles per second. This requires a minimum sampling frequency for each channel of 6000 times per second; but in order to facilitate separation of the signal frequencies from the sampling frequency, the latter will be taken as 10,000 per second.

Accordingly, synchronising pulses will be transmitted at intervals of 100 microseconds, and between any pair of synchronising pulses all the channel pulses must be transmitted in their proper time positions.

It follows that the interval or period allotted to each channel will be about 8 microseconds. In the present example, a two-index system will be assumed, and so two pulses must be transmitted during each channel period of 8 microseconds. Each of these pulses may be assumed to have a duration of about 0.1 microsecond, and in order to allow a liberal margin for imperfect phasing of the pulses, for guard intervals, and for synchronising pulse selection, a period of about 2 microseconds will be allotted for the total range of deviation of each pulse, with a gap of about 1 microsecond between the two periods.

Fig. 1 shows the apparatus required for one channel only, in addition to that required for transmitting the synchronising pulses, but the apparatus for all channels is identical, except as regards certain adjustments which will be explained, and will be duplicated for each channel.

Referring to Fig. 1, a master sine-wave oscillator 1 supplies waves at 10 kilocycles per second to a conductor 2 to which the equipment for each channel is connected. To the conductor 2 is also connected a synchronising pulse generator 3 of conventional type which produces a train of positive synchronising pulses of duration, for example, of 2 microseconds by a process of squaring the master sine wave, differentiating in order to produce pairs of positive and negative short pulses, limiting to remove negative pulses, and shaping to produce synchronising pulses of the required duration. These synchronising pulses are delivered to an output conductor 4 connected to a cable (not shown), to a radio transmitter (also not shown), or to some other suitable communication device.

The equipment for one channel comprises the remaining items shown in Fig. 1. Elements 5, 6 and 7 are adjustable phase shifting circuits of any suitable type, the adjustment of which will be explained later. Element 8 is a phase modulator to which the corresponding channel modulating input wave is applied at terminals 9 and 10. Elements 11, 12 and 13 are pulse generators similar to 3, each of which produces a train of pulses repeated with a repetition period of 100 microseconds. The pulses produced by generator 11 may conveniently be of 0.1 microsecond duration, and will be time-position modulated in accordance with the signal. The pulses produced by generators 12 and 13 are used as gating pulses, and should be of duration of about 1.8 and 2 microseconds respectively, for a reason to be explained later. These pulses will, of course, be unmodulated.

The channel pulse generator 11 is connected to two valves 14 and 15 biassed beyond cut-off, the arrangement being such that each pulse from the generator 11 sharply unblocks the valves, thereby shock-exciting two corresponding resonant circuits 16 and 17 connected respectively to the valves 14 and 15. These resonant circuits are tuned respectively to frequencies of 550 and 500 kilocycles per second.

The resonant circuits 16 and 17 should preferably each be designed to produce a short train of waves dying out after about 15 complete periods. These circuits are respectively connected to two further pulse generators 18 and 19 similar to 3, and from each of them is produced a short train of about 15 short positive pulses, which will be called a "comb" of pulses. The pulses in the comb from generator 18 will be repeated at intervals of 1.8 microseconds, while those in the comb from generator 19 will be repeated at intervals of about 2 microseconds. The comb of pulses from generator 18 and a gating pulse from generator 12 are applied to a gating valve 20 in such manner that one of the pulses from the comb is selected. The selected pulse will appear as a negative pulse; it is therefore applied to an inverting amplifier 21, and is delivered as the first positive index pulse to the conductor 4 and thence to the communication medium. Similarly the comb of pulses from generator 19 and a gating pulse from generator 13 are applied to a gating valve 22, and the selected pulse is applied through the inverting amplifier 21 as the second positive index pulse to the conductor 4.

It will be understood that a group (not shown) of elements similar to 5 to 22 will be provided for each additional channel of the system, and will be connected in the same way between conductors 2 and 4.

Figure 2:
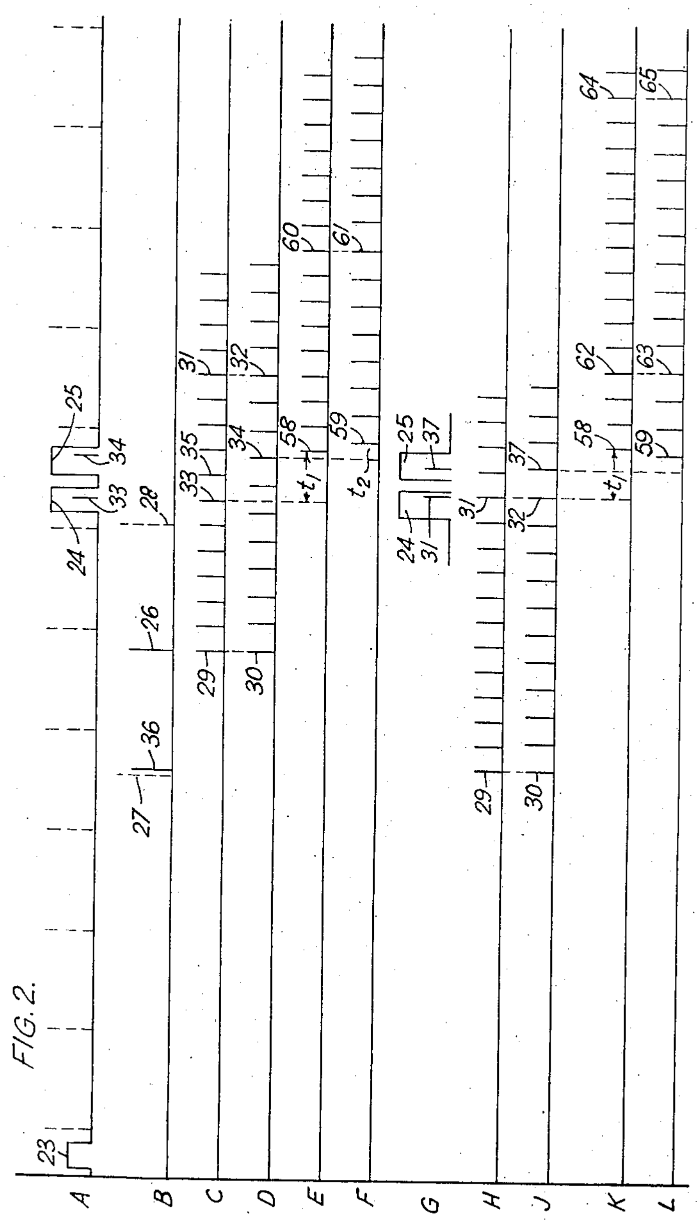
Fig. 2 shows graphical diagrams used to explain the operation of the system.

The operation and adjustment of the circuit of Fig. 1 will be explained with respect to the diagrams of Fig. 2. In this figure each graph represents pulse amplitudes with reference to a horizontal time scale and in all the graphs the time scale is the same. In graph A there are shown a series of channel periods each of 8 microseconds duration, separated by vertical dotted lines, preceded by synchronising period of 4 microseconds duration occupied by a synchronising pulse 23 produced by the generator 3 of Fig. 1. It will be assumed that the channel apparatus shown in Fig. 1 is that for channel 7, and so in the seventh channel period in graph A, Fig. 2, there are shown the two gating pulses 24, 25 generated respectively by the generators 12 and 13, Fig. 1. The phase shifters 6 and 7 should therefore be adjusted so that the pulses 24 and 25 are about 1 microsecond apart, and are approximately centred in the seventh channel period. In graph B, Fig. 2 is shown a pulse 26 (called a channel pulse) produced by the generator 11, Fig. 1, as it appears when the modulating signal voltage applied to terminals 9 and 10 of the phase modulator 8 is zero. The dotted lines 27 and 28 represent the limits of time excursion of the pulse 26 when modulated, and will be supposed to be separated by about 20 microseconds, which is about 2½ channel periods.

Graphs C and D respectively represent the combs of pulses produced by the generators 18 and 19. The initial pulses 29 and 30 of these combs are shown as coinciding in time with the pulse 26, which initiates them by means of the elements 14 to 17, as already explained. Since the repetition frequencies of these combs are 550 and 500 kilocycles per second, respectively, the twelfth pulse 31 of the first comb will also coincide with the eleventh pulse 32 of the second comb, just 20 microseconds later. These coincidences are indicated by vertical dotted lines connecting the coinciding pulses.

Now the gating pulse 24 and the comb, graph C, are applied to the gating circuit 20 Fig. 1, and accordingly only a sincle one of the pulses of this comb, namely pulse 33, will be selected and transmitted through the inverting amplifier 21. Similarly, the gating pulse 25, and the comb, graph D, are applied to the gating circuit 22, and the single pulse 34 of this comb will be selected.

It will be apparent that as the phase shifter 5 (Fig. 1) is adjusted, the pulse 26 and both the combs of graphs C and D will be shifted bodily along the time axis. The adjustment should be such that the pulses 33 and 34 selected by the gating pulses 24 and 25 are each roughly at the centre of the corresponding comb. This adjustment does not need to be very accurate.

It will be clear that the duration of the gating pulse 24 should be equal to the repetition period of the comb C, namely about 1.8 microsecond, while the duration of the gating pulse 25 should similarly be 2 microseconds. The pulses 33 and 34 will be called index pulses, and have been shown also in graph A inside the corresponding gating pulses 24 and 25.

Now if the channel pulse 26 is modulated and begins to move to the left, the combs will move with it, and the index pulse 33 will approach the left hand edge of the gating pulse 24. When it reaches this edge it will disappear, but will be replaced by the next pulse 35 which just appears inside the right hand edge of the gating pulse 24. Similarly for the pulse 34 and the gating pulse 25. Thus the time position of each transmitted index pulse indicates by itself several possible time positions of the channel pulse 26. From the positions of the two index pulses together, however, the ambiguity is resolved in the receiver according to the present invention, as will be explained later.

It will be clear that the duration of each gating pulse should ideally be just equal to the corresponding comb repetition period. However, such a critical adjustment could not be maintained, and so it is preferable to make the duration of the gating pulse slightly greater, in which case occasionally an extra pulse might be selected. This is not really material if suitable arrangements are used at the receiver, but the gate circuit 20 or 22 can be designed to suppress the extra index pulse.

In Fig. 2 the two gating pulses 24 and 25 have been repeated in their original time positions in graph G, and graphs H and J show the two combs as they appear when the pulse 26 is shifted by modulation to the position 36 which is close to the "early" excursion limit 27. It will be seen that the gating pulses 24 and 25 now select for transmission two later index pulses from the combs, one of which happens in this case to be the pulse 31 shown in graph C, and the other is designated 37. These pulses appear in the gating pulses 24 and 25 in new relative positions as indicated in graph G, and from these new positions, the position of the pulse 36 can be inferred. It will be evident that if the channel pulse 26 shifts close to the "late" excursion limit 28, the combs will be likewise shifted later, and the gating pulses 24 and 25 will select two other pulses from near the beginning of each comb.

The channel apparatus for all the other channels operates in like manner, the only difference being that the phase shifters 6 and 7 (Fig. 1) will be adjusted to bring the gating pulses similar to 24 and 25 into the corresponding channel period, and the phase shifter 5 will be adjusted accordingly to centre the comb with respect to the gating pulses, as explained. It follows that from the circuit of Fig. 1 will be transmitted a repeated series of pulses, each series consisting of a synchronising pulse followed by twelve pairs of index pulses, each pair corresponding to one channel.

Fig. 3 shows a circuit according to the invention for receiving and demodulating the index pulses produced by Fig. 1. Only the apparatus for one channel is shown, all the remaining channels being similarly equipped. The pulses after demodulation from the carrier wave (if any) are delivered to terminal 38, which is connected over conductor 39 to a synchronising pulse selector 40, of conventional type, which selects the synchronising pulses 23 (Fig. 2) and delivers them through two adjustable delay networks 41 and 42 to two pulse generators 43 and 44 similar respectively to 12 and 13 (Fig. 1) for producing gating pulses similar respectively to 24 and 25 (Fig. 2). The pulse generators 43 and 44 are connected respectively to two gating circuits 45 and 46, to each of which is also connected the conductor 39. The first and second index pulses respectively selected by the gating circuits are respectively applied to blocked valves 47 and 48 for shock-exciting two corresponding resonant circuits 49 and 40, tuned respectively to 550 and 500 kilocycles per second. The short trains of waves so produced are applied through phase shifters 51 and 52 to pulse generators 53 and 54 for producing two corresponding combs of pulses similar to those produced in the circuit of Fig. 1. The elements 47 to 50 and 53, 54 may be similar respectively to the elements 14 to 19 of Fig. 1.

The two combs of pulses are simultaneously applied to a coincidence circuit 55 from the output of which is obtained a single pulse having the same degree of time modulation as the original channel pulse 26 (Fig. 2). The coincidence circuit 55 may be a valve gating circuit similar to 20 and 22 (Fig. 1) which gives an output pulse only when it receives two simultaneous input pulses. The pulses from the coincidence circuit 55 are then applied to a demodulator 56 from the output of which the original input wave is obtained. The demodulator should preferably be of the type employing a frequency discriminator for a reason which will be explained later.

The elements 41 to 56 will be duplicated for each channel, and the connections of the additional apparatus will be made in the same way to conductors 39 and 57.

The delay networks 41 and 42 should be adjusted so that the gating pulses produced by the generators 43 and 44 are spaced from the received synchronising pulse by the same times as the pulses 24 and 25 (Fig. 2 graph A) are spaced from the synchronising pulse 23.

In the explanation which follows, the transmission delay which occurs in the communication medium and circuits, and which affects all pulses equally, will be neglected. When it is stated that events occur "at the same time" at both ends of the system, it will be understood that the times really differ by the constant transmission delay.

The two index pulses 33 and 34 will be received at the times indicated in graph A, Fig. 2. After selection by the gating circuits 45 and 46 these pulses will initiate two combs of pulses shown in graphs E and F. The initial pulses 58 and 59 of these combs will be delayed after the corresponding pulses 33 and 34 according to the adjustment of the phase shifters 51 and 52. The corresponding delays are indicated as $t1$ and $t2$. These times should be adjusted by means of the phase shifters 51 and 52 so that when the channel pulse 26 is unmodulated, a coincidence occurs between two pulses 60 and 61 each of which is approximately at the centre of the corresponding comb. The significant point is that this coincidence is determined by the difference $t1-t2$ and so the actual values chosen for $t1$ and $t2$ are not critical provided that their difference has the necessary value.

Now it is clear that if the comb, graph C were delayed by the time $t1$, its later pulses would exactly coincide in time with the pulses of comb graph E, while if the comb graph D were delayed by the time $t2$, its later pulses would coincide exactly with the pulses of comb F. Thus if $t1$ and $t2$ are constant, the coincidence 60—61 will occur at a fixed time after the coincidence 29—30, which coincides with the channel pulse 26. In other words, the coincidence 60—61 occurs at a fixed time T after the channel pulse 26, and will move with it.

The coincidence of pulses 60 and 61 thus causes the coincidence circuit 55 (Fig. 3) to produce an output pulse which is always the constant time T later than the channel pulse 26, and will therefore bear the same time modulation, which extends over a range of ±10 microseconds, in spite of the fact that the time excursion of the index pulses is only ±1 microsecond.

Graphs K and L show the positions of the combs produced by the elements 53 and 54 at the receiver when the channel pulse 26 is shifted to the position 36. The initial pulses 58 and 59 of the combs of graphs K and L are again respectively later than the pulses 31 and 37 shown in graph C by the times $t1$ and $t2$; and the pulses 62 and 63 from each comb which now coincide are earlier in the combs, but they still coincide later than the channel pulse 36 by the time T. Hence the pulses obtained at the output of the coincidence circuit 55 (Fig. 3) are spaced in time in exactly the same way as the original modulated channel pulses, but are later by the time T.

It should be pointed out that a second coincidence occurs between the pulses 64 and 65 of the combs K and L exactly 20 microseconds later than the first one. This will produce a corresponding second output pulse which, however, is immaterial if a suitably tuned discriminator is used for demodulating the output pulses. If desired, however, the coincidence circuit 55 can be designed to suppress the second output pulse.

So far nothing has been said about the duration of the pulses which make up the combs. Since all the combs at the transmitting and receiving ends are effectively locked together in time, the pulse duration is theoretically immaterial so long as it does not exceed a value which would cause unwanted partial coincidences between the combs. However, the effect of noise has to be taken into account. Noise will cause the combs at the receiving end to shift independently in time by small amounts, and if the pulses are too short, some of the wanted coincidences may be lost altogether. Since the difference between the repetition periods of the two combs is about 0.2 microsecond, if the pulse duration is chosen to be 0.1 microsecond, when a mutual shift of the two combs reaches a value such as just to cause the proper coinciding pulses to miss one another, there will just be a coincidence of the adjacent pair of pulses, with, of course, a corresponding error in the position of the output pulse. Thus, the duration to be chosen for the comb pulses at the receiving end is half the difference between the two comb periods, which in this case will be 0.1 microsecond. If the duration of the comb pulses exceeds the whole difference between the two comb repetition periods, then multiple coincidences will appear even in the absence of noise. It should be pointed out, however, that the duration of the comb pulses at the transmitting end, and of the index pulses derived therefrom, need not be the same as the duration of the comb pulses at the receiving end, this latter duration being determined in the manner already explained.

At the transmitting end the duration to be chosen for the comb pulses is not critical, but for the sake of uniformity the same value of 0.1 microsecond may be chosen for the duration of these pulses.

A consideration of Fig. 2 will show that if occasionally two adjacent index pulses are admitted by one of the gating pulses 24 or 25 at the transmitting end, the effect at the receiving end will be negligible. All that will happen is that the corresponding resonant circuit 49 or 50 (Fig. 3) will be shock-excited a second time in the same phase. This will increase the amplitude of the train of waves so produced, but the resulting pulse comb (graph C or D, Fig. 2) will be unaffected.

It has been stated that the number of pulses in each of the combs should be about 15. The actual number is not critical, but the number should be such that the total duration of the comb exceeds by a reasonable margin the sum of the total time excursion of the channel pulse 26 and the time occupied by the two gating pulses 24 and 25. Thus in the present example, the duration of the pulse comb should exceed 20+5=25 microseconds. Fifteen pulses of the comb graph D occupy 28 microseconds, which gives a safe margin.

It is desirable to explain at this point that although the initial pulses 29 and 30 of the combs, graphs C and D, Fig. 2, have been shown for simplicity as coinciding in time with the channel pulse 26, in practice there will not generally be an exact coincidence, because the first pulse produced by each of the resonant circuits 16 and 17 (Fig. 1) will be delayed slightly after the channel pulse 26, and the initial pulses 29 and 30 will not exactly coincide with one another because the periods of the two resonant circuits are different. This is however immaterial because of the phase adjustment of the corresponding combs at the receiver, already explained. The times *t1* and *t2*, graphs E and F can always be adjusted to produce the desired coincidence of pulses 60, 61, one from the centre of each comb.

The coincidence technique employed at the receiving end for resolving the ambiguity forms the subject of the present invention, and is an important factor in the improvement of the signal-to-noise ratio. In the example illustrated in Figs. 1 to 3, if the trains of waves produced by the shock-excited resonant circuits 49 and 50 (Fig. 3) were heterodyned together to yield a 50 kilocycle wave from which the output pulse is derived, this wave and pulse would bear the time modulation of the original channel pulse 26, but the small relative phase shifts of the two heterodyned waves caused by the noise would be multiplied ten times, and no advantage would be gained. However by the use of the coincidence technique there is no such multiplication effect. If it be assumed for example that the noise is sufficient to shift either of the received index pulses by amounts not exceeding $\frac{1}{20}$ microsecond, then it can easily be seen that the leading edge and the trailing edge of the output pulse passed by the coincidence circuit 55 (Fig. 3) can each be late or early by not more than $\frac{1}{20}$ microsecond, while the duration of the output pulse can never exceed $\frac{1}{10}$ microsecond, though it may often be less than this. It thus appears that the noise power which accompanies the reproduced channel pulse cannot exceed the noise power which accompanies one of the index pulses. If therefore, the time excursion of the original modulated channel pulse is ten times the time excursion of the index pulses, it will be seen that an improvement of signal-to-noise ratio of 20 decibels is obtained.

Figure 4:
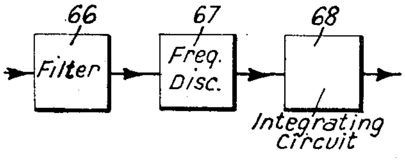

If in the demodulation process both the leading and trailing edges of the reproduced pulses are utilised, then a further gain of 3 decibels in signal-to-noise ratio can be obtained, because the noise which affects each edge is derived from a different index pulse, and so the deviation of the mean position of the pulse is on the average less than the deviation of either edge, because the two noise effects are unrelated. Advantage may be taken of this if the time position modulated pulses at the output of the coincidence circuit 55 (Fig. 3) are demodulated in a suitable way. Fig. 4 shows a block schematic circuit of the preferred form of the demodulator 56 of Fig. 3. It consists of a band pass filter 66 for selecting a harmonic of the repetition frequency (10 kilocycles per second) of the output pulses followed by a frequency discriminator 67 of any conventional type at the output of which will be obtained the differential of the signal wave (since the original channel pulse 26, Fig. 2, was effectively phase modulated). To obtain the signal wave itself the discriminator 67 is followed by an integrating circuit 68, according to well known practice. This method of demodulating position modulated pulses is described in British patent specification No. 581,005 (C. T. Scully 28).

When this method is used, the reproduced noise depends on the variation of the mean time position of the pulses and not alone on the variation of the leading or trailing edges. In this case, the harmonic selected by the filter 68 should preferably be the fifth harmonic (50 kilocycles per second) since by this choice the extra pulses due to repeated coincidences of the combs at the receiver already referred to will have no undesirable effect.

The discriminator 67 may for example be of the Foster-Seeley type illustrated in Fig. 52*a* on page 586 of the Radio Engineer's Handbook by F. E. Terman, 1st Edition, 1943. Since such a discriminator generally includes tuned circuits, which can be used for selecting the desired harmonic, the filter 66 may not be required.

If the duration of the comb pulses is assumed to be 0.1 microsecond, it will be seen that if the noise is such that the index pulses can be shifted by more than 0.05 microsecond, then the coincidence shifts to the adjacent pair of pulses, and a timing error of 2 microseconds will occur for the reproduced pulse. If the noise is such that the error occurs relatively frequently then no appreciable advantage can be obtained by the arrangement described. For this reason the noise conditions should be moderately good in order that the improvement of signal-to-noise ratio could be obtained according to the invention.

It may be said that the important feature which enables the advantage to be obtained is that the demodulation process includes an operation which is non-linear or discontinuous; thus the two combs at the receiving end may be progressively shifted in time relatively to one another for a certain time without materially affecting the result, up to a point at which a sudden relatively large change in the result occurs.

In a multichannel two-index system of the kind to which the present invention is applicable, the interchannel cross-talk will be principally from the channel preceding the channel concerned, and most of it will affect the first of the two index pulses. The effect of this cross talk may be practically eliminated by increasing the duration of the comb pulses corresponding to the first index pulse at the receiving end, and decreasing the duration of the comb pulses corresponding to the second index pulse, while maintaining the sum of the two pulse durations equal to the difference between the two comb repetition periods. In these circumstances the pulse produced at the output of the coincidence circuit 55 (Fig. 3) will not be affected by the crosstalk deviations of the first comb, but will bear as before the noise deviations derived from the second comb.

If desired, three or more index pulses may be used to characterise the time position of the pulse 26, Fig. 2. The signal-to-noise ratio can then be further increased provided that the signal-to-noise ratio of each individual index channel is already fairly good.

This can be done by providing in Fig. 1 additional elements (not shown) corresponding to 6, 12, 14, 16, 18 and 20, for each additional index. There will of course be additional gating pulses (not shown) similar to 24 and 25, Fig. 2, graph A, and the duration and separation of these gating pulses must be adjusted so that they fit into the channel period with reasonable margins. In the receiver (Fig. 3) the elements 41, 43, 45, 47, 49, 51 and 53 will be duplicated for each index, and the coincidence circuit 55 will be designed to operate only on the simultaneous receipt of one pulse from each comb.

Figure 5:
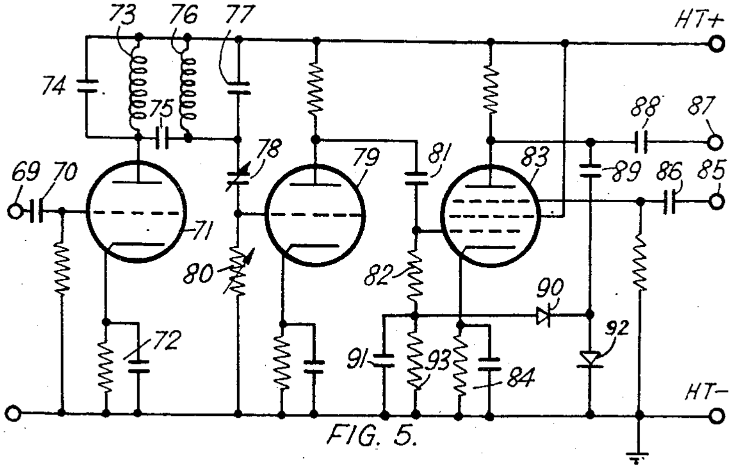
Figs. 4, 5 and 6 show details of certain elements of Fig. 3.

Fig. 5 shows details of the elements 47, 49, 51, 53 and 55 of Fig. 3 combined in a single circuit. In Fig. 5 index pulses from the gating circuit 45, Fig. 3, are applied to an input terminal 69 which is connected through a capacitor 70 to the control grid of a valve 71 which is normally blocked by cathode bias produced by the network 72. Connected in series with the anode circuit of valve 71 is a parallel resonant circuit comprising an inductor 73 and a capacitor 74. This resonant circuit is coupled through a capacitor 75 to a second similar parallel resonant circuit comprising an inductor 76 and a capacitor 77 tuned to the same frequency as the first parallel resonant circuit. The tuning frequency will be slightly different from 550 kilocycles per second, and should be chosen so that a narrow band-pass filter is produced with the band centered on 550 kilocycles per second. The elements 73 to 77 make up the resonant circuit 49 of Fig. 3.

The elements 73 to 77 may be so designed that when shock excited by the sudden unblocking of the valve 71 by a positive pulse from the gating circuit 45, Fig. 3, a train of output waves is produced, the amplitude of which expands uniformly from zero, and then contracts again. This condition may be obtained by choosing the value of the capacitor 75 so that critical coupling is produced between the two resonant circuits whereby they constitute substantially a band-pass filter with a "flat topped" frequency characteristic. By suitable choice of the resonance frequency and damping factors of the resonant circuits, each shock-excitation may be made to produce a short train of waves with about 15 positive and 15 negative loops of appreciable amplitude.

It may be added that the resonant circuits may be constituted by various forms of filter circuits or other resonant networks. Thus the term "resonant circuit" should therefore be understood to include any appropriate network of any of these types.

The train of output waves from the resonant circuit is applied through a blocking capacitor 78 to the control grid of a limiting valve 79 provided with a variable grid resistor 80. The valve 79 should be so biased and arranged that there are produced at the anode a series of about 15 positive and 15 negative rectangular waves or pulses, according to the well known "squaring" technique. The variable elements 78 and 80 constitute the phase shifter 51 in a simple form. Any other suitable phase shifting network could be used instead. The rectangular waves generated at the anode of the valve 79 are differentiated by the capacitor 81 and resistor 82 to produce about 15 pairs of short positive and negative differential pulses which are applied to the control grid of the coincidence valve 83 normally biased beyond the cut-off by the cathode bias network 84. The negative differential pulses have no effect on the coincidence valve, and the 15 positive diffenential pulses constitute the comb illustrated in graph E, Fig. 2. The pulse comb shown in graph F produced from the generator 54 (Fig. 3) in a similar manner is also applied to terminal 85 (Fig. 5) and through the blocking capacitor 86 to the suppressor grid of the coincidence valve, thereby producing an output pulse which passes from the anode to the output terminal 87 through the blocking capacitor 88, when a pulse from one comb occurs simultaneously with one pulse from the other. The output pulse then bears the same time modulation as the original channel pulse 26 (Fig. 2) and is passed to the demodulator 56, Fig. 3.

In order to prevent the coincidence valve 83 (Fig. 5) from producing a second output pulse corresponding to an extra coincidence between comb pulses, as explained above, the anode of the valve 83 is connected through a capacitor 89 and a rectifier 90 to the capacitor 91 connected in series between the resistor 82 and ground. The leading edge of an output pulse (which will be negative-going because of the inversion through the coincidence valve) charges the capacitor 91 negatively, thereby increasing the grid bias so that the valve 83 will not respond to the extra coincidence. A second rectifier 92 connects the capacitor 89 to ground, and provides a low resistance path for the positive-going trailing edge of the output pulse. The resistor 93 shunting the condenser 91 should be chosen so that the corresponding time constant is large compared with the coincidence period of the combs (20 microseconds) but small compared with the repetition period of the channel pulses (100 microseconds), so that the condenser 91 will be subsantially discharged by the time that the pulse combs corresponding to the next channel pulse arrive at terminals 69 and 85.

It will be understood that the elements 48, 50, 52 and 54 of Fig. 3 can be produced by duplicating the elements 69 to 81 of Fig. 5, the only difference being that the resonant circuit connected to the anode of the valve 71 should be tuned to 500 kilocycles per second. The elements 89 to 93 of Fig. 5 are not essential, and could be omitted.

Figure 6:
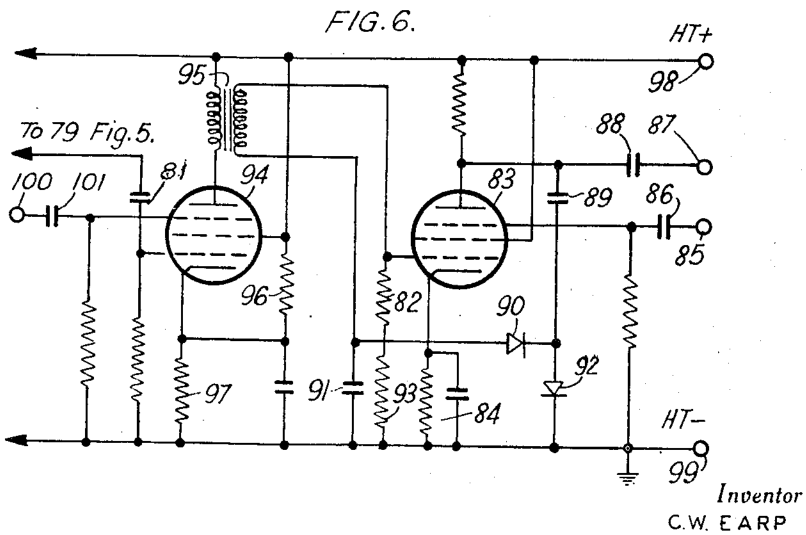

When three or more indices are employed, it is preferable to duplicate the coincidence valve 83, as shown in Fig. 6, for three indices. The coincidence valve 83 with its associated elements are arranged in the same way as in Fig. 5, and the control grid instead of being connected to the capacitor 81 and thence to the valve 79 (not shown in Fig. 6), is connected to the anode of an additional coincidence valve 94 through a transformer 95.

The valve 94 is biased beyond the cut-off by the resistances 96 and 97 connected between the positive and negative high tension terminals 98 and 99, and its control grid is connected to the capacitor 81. An input terminal 100 for the third index comb is connected through a blocking capacitor 101 to the suppressor grid of the valve 94.

The valve 94 should be biased so that it will only respond if pulses from the first and third index combs arrive simultaneously on the control and suppressor grids, respectively. When the valve responds, a pulse will be generated at the anode, and the transformer 95 should be so connected that a corresponding positive pulse is applied to the control grid of the coincidence valve 83 which will respond only if it receives a pulse simultaneously from the terminal 85 to which the second index comb is applied. Thus this valve only produces an output if a triple coincidence occurs between pulses, one from each digit comb. If desired, a resistance (not shown) corresponding to 96 may be connected between the cathode of the valve 83 and the terminal 98 in order better to determine the cathode voltage.

It will be evident that if four or more indices are employed the necessary number of additional coincidence valves may be arranged in front of, and in the same manner as, the valve 94, forming a chain terminating in the valve 83. Only this last valve need be provided with the elements for suppressing the effect of extra coincidences.

Figure 7:
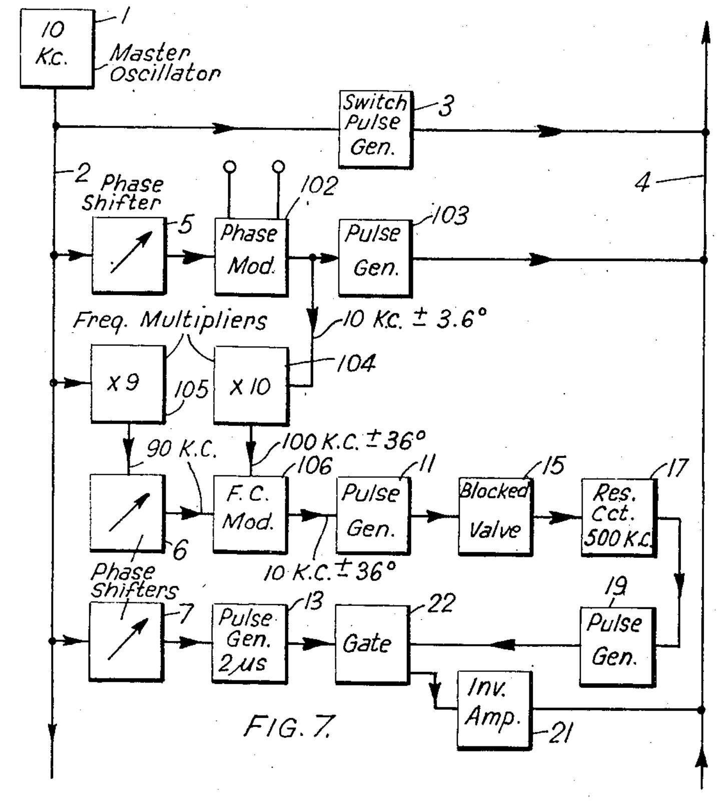
Fig. 7 shows a block schematic circuit diagram of the transmitting arrangements of another ambiguous index system to which the present invention is also applicable.
Figure 9:
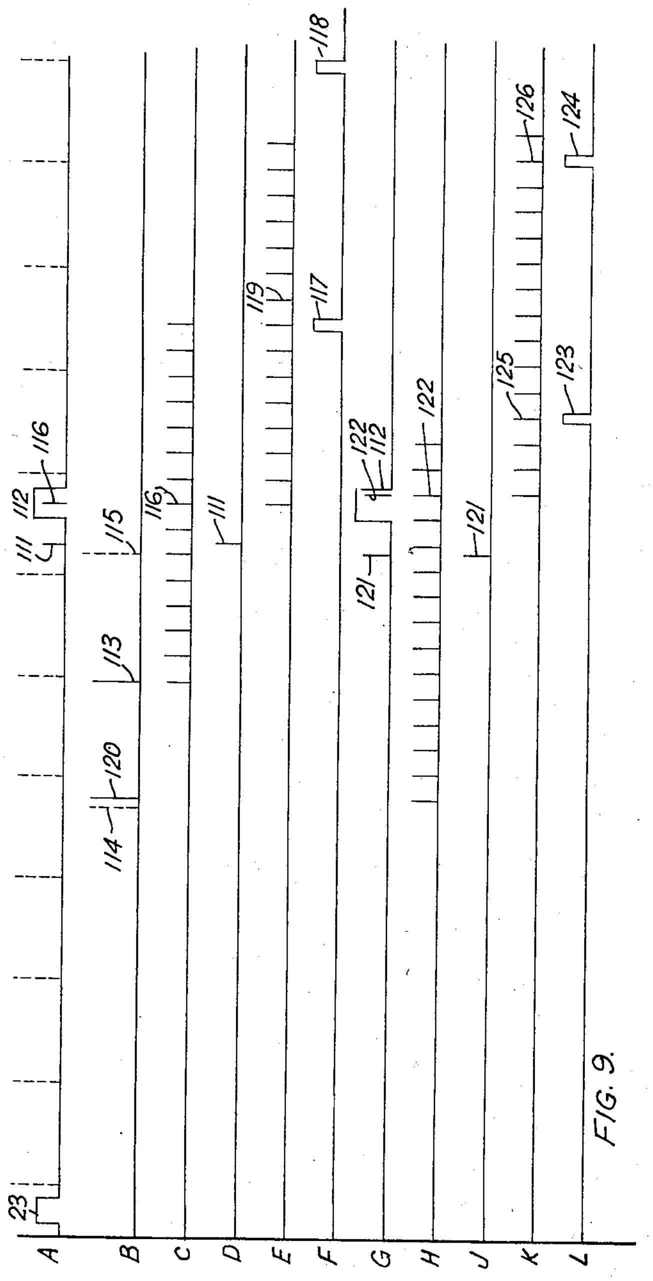
Fig. 9 shows graphical diagrams used to explain the operation of the system of Fig. 7.

Figs. 7, 8 and 9 show the invention applied to a two-index pulse system in which only one index is ambiguous. The unambiguous index is represented by a normal position modulated pulse, which is transmitted with a small time excursion approximately the same as that of the ambiguous index pulse.

The transmitting circuit of this system is shown in Fig. 7. Certain of the elements are the same as certain of those shown in Fig. 1, and have been given the same designation numbers. The phase modulator 102 is similar to 8, Fig. 1, except that the phase excursion is limited to ±3.6° whereby the pulses produced by the pulse generator 103 (which is similar to 3) have a time excursion within the limits ±1 microsecond. These pulses are transmitted direct to the conductor 4 as the first index pulses and carry the input wave with small deviation, but without ambiguity.

In order to obtain the ambiguous index pulse, the phase modulated waves at the output of the modulator 102 are applied to a frequency multiplier 104 which multiplies the frequency by ten. The output waves from this multiplier will accordingly bear a phase modulation which is multiplied by ten, and will therefore be within the limits ±36°.

A second frequency multiplier 105 is connected to conductor 2 and multiplies the frequency from the master oscillator 1 by 9, producing an unmodulated output wave of frequency 90 kilocycles per second. These waves are applied through the phase shifter 6 to an amplitude modulator 106 operated as a frequency changer, together with the phase modulated waves of frequency 100 kilocycles per second from the multiplier 104. The lower sideband having a frequency of 10 kilocycles per second is selected by a filter included in the frequency changing modulator 106, and is applied to the pulse generator 11 which produces a channel pulse from which, as before, a pulse comb is produced by the elements 15, 17 and 19. It should be noted that the sideband at 10 kilocycles per second will bear the same degree of phase modulation as the 100 kilocycle wave at the output of the frequency changer 104, that is within the limits ±36°, or ten times the degree of modulation of the 10 kilocycle wave at the output of the phase modulator 102. Thus the channel pulses at the output of the pulse generator 11 will bear a time modulation within the limits ±10 microseconds. Assuming that the resonant circuit 17 is tuned to 500 kilocycles per second, as in the case of Fig. 1, the pulse comb produced at the output of the pulse generator 19 will be exactly similar to the comb shown in graph D, Fig. 2.

The receiver circuit, Fig. 8, has also several elements similar to elements in Fig. 3 and bearing the same designation numbers. The first and second index pulses of the channel are respectively selected as before by the gating circuits 45 and 46 by means of corresponding gating pulses of 2 microseconds duration derived from the synchronising pulse selector 40. The second index pulse produces a pulse comb as before by means of the blocked valve 48, resonant circuit 50 tuned to 500 kilocycles per second, and pulse generator 54. The first unambiguous index pulse produces a train of waves at the output of the resonant circuit 49 which in this case is tuned also to 500 instead of 550 kilocycles per second. These are supplied to a frequency changing modulator 107 which is also supplied with a continuous unmodulated wave of frequency 450 kilocycles per second through a phase shifter 108. This wave is obtained by applying the synchronising pulses from the selector 40 to a third blocked valve 109 which shock excites a third resonant circuit 110 tuned to 450 kilocycles per escond, and having very small damping, so that a substantially continuous 450 kilocycle output wave is obtained. The lower sideband output at 50 kilocycles per second is selected from the modulator 107 by a band filter included therein, and is supplied to the pulse generator 53.

Since the first index pulse is time modulated within the limits ±1 microsecond, the 500 kilocycle wave at the output of the resonant circuit 49 will be phase modulated within the limits ±180°. It follows that the 50 kilocycle sideband at the output of the modulator 107 will also be phase modulated within the limits ±180°. Thus the total time excursion of the comb of pulses produced by the pulse generator 53 will be ±10 microseconds, and these pulses will be repeated at intervals of 20 microseconds. This comb is much coarser than the other, and its pulses are used more like gating pulses to enable the coincidence circuit 55 to pick out the particular pulse of the comb produced by the pulse generator 54 which corresponds to the time deviation of the original channel pulse.

Since the first index pulse has only a small time excursion, it will be subject to noise, the effect of which is multiplied by ten because of the frequency change produced by the modulator 107. Accordingly, the pulses produced by the generator 53 must be considerably lengthened in order that this noise shall not be transferred to the pulses produced at the output of the coincidence circuit 55. A duration of about 1 microsecond would be suitable for these pulses, assuming that the pulses of the other comb are of 0.1 microsecond duration as before. The gain of 3 decibels in signal-to-noise ratio obtained from the combination of the noise affecting the two combs in the previous arrangement is accordingly not available in the present case.

The operation of the circuit will be explained with reference to Fig. 9, which is similar to Fig. 2. Graph A shows the channel periods arranged as before. In the seventh channel period are shown the unambiguous first index pulse 111 produced by the generator 103 (Fig. 7), and the gating pulse 112 of 2 microseconds duration produced by the generator 13. Graph B shows the channel pulse 113 produced by the pulse generator 11, and having limits of time excursion of ±10 microseconds represented by the dotted lines 114 and 115. Graph C shows the pulse comb produced by the generator 19 in response to the channel pulse 113 when in the unmodulated position shown. The phase shifter 6 should be adjusted so that the gating pulse 112 picks out a pulse 116 at the centre of the comb of about 15 pulses. The pulse so picked out is transmitted as the ambiguous second index pulse. Graph D shows again the unambiguous first index pulse 111 which is transmitted. In this case no second comb of pulses is produced at the transmitter.

The second index pulse 116 produces at the receiver (Fig. 8) the comb shown in graph E, which occurs at the output of the generator 54. The first index pulse 111 produces at the output of the generator 53 a comb of pulses spaced 20 microseconds apart, two of which are shown at 117 and 118 in graph F. These pulses should be much wider than the pulses of the other comb as already stated. By adjusting the phase shifter 108 (Fig. 8) the pulses 117 and 118 may be shifted either way along the time axis, and the adjustment should be such that the pulse 117 coincides with the centre pulse 119 of the comb, graph E, when the channel pulse 113 is unmodulated. The pulse 119 appears as the reproduced channel pulse at the output of the coincidence circuit 55 (Fig. 8).

Suppose now that the channel pulse 113 shifts to the position 120 which is, for example, 9.2 microseconds early. The first index pulse 111 will shift by exactly one tenth of this value, namely 0.92 microsecond, earlier, to the position shown in graph G at 121. At the same time the comb, graph C shifts 9.2 microseconds earlier to the position shown in graph H, and the gating pulse 112 shown also in graph G, will pick out a later pulse 122 for transmission as the second index pulse. At the receiver, the first index pulse 121 shown again in graph J will occur 0.92 microsecond earlier than before. The receipt of the index pulse 122 will initiate the comb shown in graph K, while the pulse 121 will produce the two pulses 123 and 124 shown in graph L. Since the shift of the pulse 121 is effectively multiplied by ten on account of the frequency change in the modulator 107, it is evident that the pulses 123 and 124 will be 9.2 microseconds earlier than before. The pulse 123 will pick out a pulse 125 from the comb, graph K, and it will be evident that this pulse must be spaced from the pulse 120 in graph B by the same time as the pulse 119 graph E is spaced from the pulse 113. In other words the time excursions of the channel pulse 113 are reproduced exactly by the pulses at the output of the coincidence circuit 55. The noise which accompanies the output pulses is only that which accompanies the second index pulse which is not multiplied up by a frequency changing process.

It will be noted from graphs K and L that the pulse 124 will sometimes pick out a second pulse 126 from the comb generated at the receiver. As already explained above, this will be immaterial if the discriminator is tuned to 50 kilocycles per second; or the additional pulse can be eliminated in the coincidence circuit 55 (Fig. 8).

Additional ambiguous indices may be employed if desired, and may be useful when the signal-to-noise ratio of the digit channels is such that false coincidences may be produced. The apparatus is duplicated at the transmitter and receiver as already explained with respect to Figs. 1 and 3, and no multiplying frequency changes are needed for the extra indices unless they are derived from combs with a smaller time shift than the first one.

Attention is directed to the use of the frequency change applied to the output of the resonant circuit 49 in Fig. 8. This is necessary to make equal the envelope time shifts of the phase modulated waves from which the combs are respectively derived, and these time shifts must always be equalised before the coincidence principle can be applied. By envelope time shift we mean the maximum time shift of some characteristic point, such as a zero point, of the wave. In the system described with reference to Figs. 1 to 6, the index pulses were derived in the transmitter from two combs with equal time shifts, and so the envelope time shifts of the phase modulated waves derived from these index pulses at the receiver (Fig. 3) were already equal. In the present case, the ambiguous second index pulse was derived from a comb having ten times the time shift of the unambiguous pulse, and so a time shift multiplication of 10 had to be introduced in the receiver (Fig. 8) in order that the two resulting phase modulated waves, and the combs derived from them, should have the same envelope time shift. It may be mentioned that for a given small change in amplitude of the input wave the time shift of the second index pulse will be ten times that of the first one.

It will be evident that any comb derived by differentiation in the manner described from a phase modulated wave will have the same envelope time shift as the wave. It may be also pointed out that the phase modulated waves at the outputs of the elements 49 and 50 have different frequencies but the same envelope time shift in Fig. 3, but they have the same frequency but different envelope time shifts in Fig. 8.

It should perhaps be explained that the multiplication is obtained in the frequency changing modulator because the output sideband bears the same angular phase shift as the input phase modulated wave, when the heterodyne wave is unmodulated, and the time shift corresponding to a given angular phase shift is inversely proportional to the frequency. Therefore as the lower sideband having one tenth the frequency of the input wave is selected from the modulator, the envelope time shift of the sideband will be multiplied by ten.

While the principles of the invention have been described above in connection with specific embodiments and particular modifications thereof, it is to be clearly understood that this description is made only by way of example and not as a limitation on the scope of the invention.

What is claimed is:

A receiver for an electric pulse communication system in which a single sample of a signal wave is represented unambiguously by a first position modulated index pulse, and also ambiguously by a second position modulated index pulse, and in which a small change in the value of the same produces respective time shifts of the first and second index pulses in the ratio 1 to $n$ where $n$ is an integer greater than 1, comprising means for causing each index pulse to generate a corresponding phase modulated train of waves, both trains having the same frequency, an amplitude modulator circuit for changing the frequency of the train of waves corresponding to the first index pulse to $1/n$th of its value, means for deriving from the frequency changed wave and from the wave corresponding to the second index pulse respective combs of pulses in which the frequency of repetition of the pulses of each comb is equal to the frequency of the corresponding wave, means for applying each comb of pulses to a coincidence circuit, and means for deriving an output pulse from the said circuit in response only to the simultaneous application thereto of one pulse from each comb.

References Cited in the file of this patent

UNITED STATES PATENTS

| | | |
|---|---|---|
| 2,452,547 | Chatterjea et al. | Nov. 2, 1948 |
| 2,545,464 | Hoeppner et al. | Mar. 20, 1951 |
| 2,547,001 | Grieg | Apr. 3, 1951 |